US008602329B2

(12) United States Patent
Tian (10) Patent No.: US 8,602,329 B2
(45) Date of Patent: *Dec. 10, 2013

(54) VARIABLE ORIFICE NOZZLE (75) Inventor: Lei Tian, Champaign, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 131 days.

This patent is subject to a terminal disclaimer.

(21) Appl. No.: 12/928,528

(22) Filed: Dec. 14, 2010

(65) Prior Publication Data
US 2011/0204157 A1    Aug. 25, 2011

Related U.S. Application Data (63) Continuation of application No. 11/973,639, filed on Oct. 9, 2007, now Pat. No. 7,938,337.

(51) Int. Cl.
B05B 1/00          (2006.01)
(52) U.S. Cl.
USPC ........ 239/602; 239/546; 239/533.1; 239/107; 239/DIG. 12
(58) Field of Classification Search
USPC ............... 239/602, 546, 107, 533.1, DIG. 12
See application file for complete search history.

(56) References Cited

U.S. PATENT DOCUMENTS

| 3,474,968 | A | * | 10/1969 | Jackson ........................ 239/118 |
| 4,449,669 | A | | 5/1984 | Mehoudar |
| 5,134,961 | A | | 8/1992 | Giles et al. |
| 5,249,745 | A | | 10/1993 | Bertolotti |
| 5,465,905 | A | | 11/1995 | Elder |
| 5,794,849 | A | | 8/1998 | Elder |
| 5,908,161 | A | | 6/1999 | Womac et al. |
| 5,941,462 | A | | 8/1999 | Sandor |
| 6,126,088 | A | * | 10/2000 | Wilger et al. ................. 239/170 |
| 6,669,120 | B2 | * | 12/2003 | Vernia ........................... 239/600 |
| 6,705,549 | B2 | * | 3/2004 | Nakamura ................ 239/533.1 |
| 7,124,964 | B2 | | 10/2006 | Bui |
| 2004/0069875 | A1 | | 4/2004 | Bui |
| 2009/0090796 | A1 | | 4/2009 | Tian |

FOREIGN PATENT DOCUMENTS

WO    WO 03/015928 A1    2/2003
WO    WO 2004/023865 A1   3/2004

OTHER PUBLICATIONS

Bui, Quy D. Ph.D., VariTarget—A New Nozzle with Variable Flow Rate and Droplet Optimization; Paper No. 051125 of ASAE Meeting Presentation; Jul. 17-20, 2005, pp. 1-6.
Individual Nozzle Bodies; at least as early as Sep. 1, 2007.

* cited by examiner

Primary Examiner — Dinh Q Nguyen
(74) Attorney, Agent, or Firm — Krieg DeVault LLP (57) ABSTRACT A spray nozzle assembly includes a pressure dependent variable spray orifice and an internal chamber which is at least partially bound by a flexibly deformable sidewall. At its distal end, the sidewall terminates at a distal face defining the spray orifice extending therethrough. A metering member extends distally from the internal chamber and through at least a portion of the spray orifice. As the pressure of a liquid supplied to the internal chamber by a liquid supply pathway varies, the flexibly deformable sidewall expands or contracts in response thereto. As the sidewall expands and contracts, the distal face moves relative to the metering member to change the effective size of the spray orifice.

6 Claims, 7 Drawing Sheets

VARIABLE ORIFICE NOZZLE

The present application is a continuation of and claims priority to U.S. patent application Ser. No. 11/973,639 filed Oct. 9, 2007 now U.S. Pat. No. 7,938,337, the contents of which are incorporated herein by reference in their entirety.

The present application relates to a nozzle assembly and manner of using the same, and more particularly, but not exclusively, relates to a nozzle assembly including a pressure dependent variable spray orifice.

The use of nozzle assemblies for spraying a liquid (e.g. chemicals) has become commonplace. In many applications, the nozzle and its target are moving in relation to one another. Under such conditions, current nozzle assemblies may be susceptible to various shortcomings, such as under- or over-spray because of the difficulties in flow rate adjustment. For instance, agricultural sprays can be adversely impacted by variation in the speed of the spray nozzle relative to its target field as a result from uneven terrain or the like. To account for this variation, control over liquid pressure may be provided by the spray equipment; however, pressure control has a fairly limited range, and at the margins can result in undesired alteration of droplet size and/or spray pattern. In one attempt to address these limits, different spray tips can be interchanged to increase the control range. For one arrangement, several spray tips are provided by the nozzle assembly that are individually selectable by rotation relative to a common nozzle body. However, this scheme typically requires manual intervention and/or results in a relatively complex nozzle assembly. Thus, there is a need for additional contributions in this area of technology.

One embodiment of the present application is a unique nozzle. Other embodiments include unique methods, systems, devices, kits, assemblies, equipment, and/or apparatus involving a variable orifice nozzle.

One object of the present application is to provide a unique nozzle.

Alternatively or additionally, another object of the present application is to provide unique methods, systems, devices, kits, assemblies, equipment and/or apparatus involving a variable orifice nozzle.

Further embodiments, forms, features, aspects, benefits, objects, and advantages of the present application shall become apparent from the detailed description and figures provided herewith.

DETAILED DESCRIPTION OF REPRESENTATIVE EMBODIMENTS

While the present invention can take many different forms, for the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications of the described embodiments, and any further applications of the principles of the invention as described herein are contemplated as would normally occur to one skilled in the art to which the invention relates.

One embodiment of the present application is generally directed to a nozzle assembly including a pressure dependent variable orifice. More particularly, the nozzle assembly includes a sidewall extending between a proximal end and a distal end that at least partially bounds an internal chamber. The internal chamber includes a metering member which extends distally toward a spray orifice defined by the distal end of the nozzle assembly. Additionally, the internal chamber communicates with a liquid supply pathway from which the internal chamber may receive a liquid. At least a portion of the sidewall is elastically deformable to facilitate expansion and contraction of the internal chamber in response to a degree of pressure change therein. As the chamber expands and contracts, the distal end moves relative to the metering member to change the effective size of the spray orifice. Still further aspects and features of the present application are described with respect to the illustrated embodiments as follows.

Figure 1:
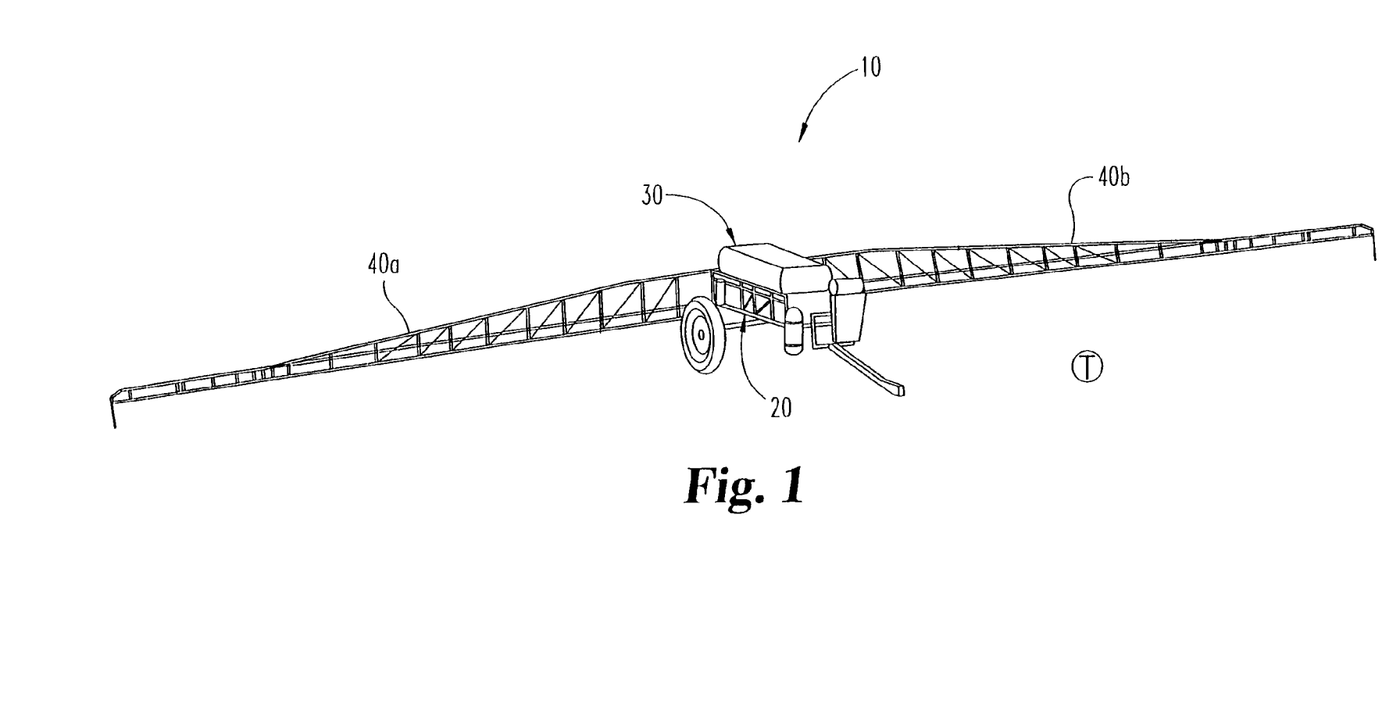
FIG. 1 is a perspective view of one embodiment of an agricultural spraying implement.

For example, referring generally to FIG. 1, there is illustrated in perspective view an agricultural spraying implement 10 to which a nozzle assembly according to the present application may be coupled. In the illustrated embodiment, implement 10 is generally configured as a pull-behind trailer 20 which includes a tank 30 for holding a liquid to be sprayed by implement 10. Tank 30 is in fluid communication with a pair of boom members 40a and 40b which may extend from trailer 20 to provide adequate spray coverage to a desired area, such as, for example, a field of agricultural products designated as target T. As illustrated in the enlarged, partial section view of FIG. 2, boom member 40a includes a plurality of nozzle assemblies 50 coupled therewith. In an alternative non-illustrated embodiment, it is contemplated that boom member 40a may include as few as one nozzle assembly 50 coupled therewith or more than the number illustrated. Moreover, while boom member 40a has been illustrated in FIG. 2, it should be appreciated that like features may also be associated with boom member 40b. In one form, a number of assemblies 50 are distributed along boom members 40a and 40b to provide a generally uniform spray pattern/coverage along the entire length of implement 10 with respect to target T. Additionally, modifications to implement 10 and alternatively configured spraying implements are contemplated. For example, a spraying implement may include as few as one boom member or may include more than two boom members in other arrangements. It is also contemplated that the spraying implement may be hand-held, mounted to a land, air, or marine vehicle, or in some embodiments may included in a stand alone irrigation or spraying system—to name just a few possibilities.

Figure 2:
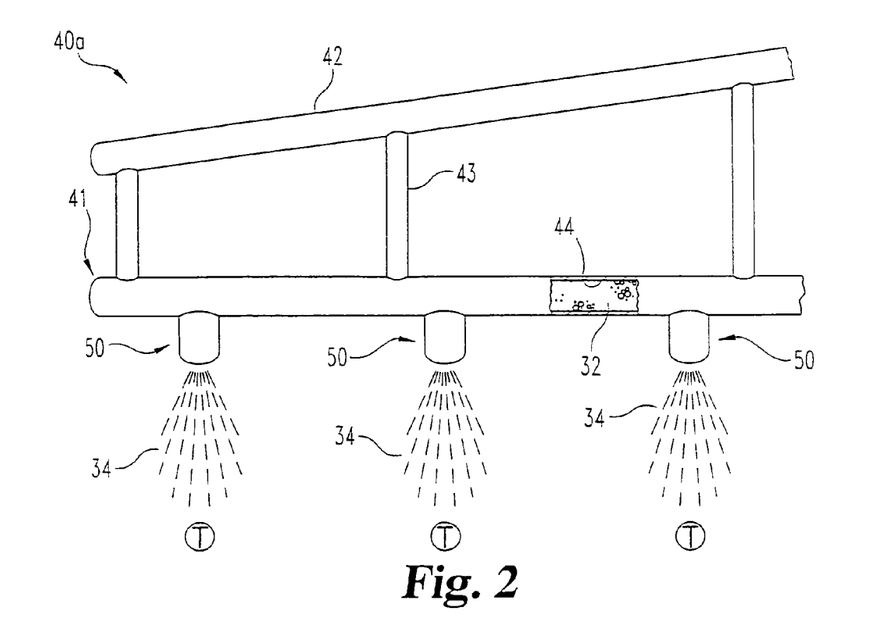
FIG. 2 is an enlarged, partial section view of a boom member of the spraying implement illustrated in FIG. 1.

With further respect to boom member 40a, it includes a lower element 41 and an upper element 42 which extends obliquely relative to lower element 41. A plurality of support members 43 extend between lower element 41 and upper element 42 in a truss-like arrangement to provide a rigid, stable structure. Lower element 41 includes a hollow interior defining a liquid supply pathway 44 through which liquid 32 may be distributed to nozzle assemblies 50 where liquid 32 is released as spray 34. It should be appreciated that liquid supply pathway 44 is also in fluid communication with tank 30 in order to receive liquid 32 therefrom. Furthermore, while not illustrated, implement 10 may include one or more tanks, pumps, pressure regulators and/or filters which facilitate delivery of liquid 32 through liquid supply pathway 44 to nozzle assemblies 50. Additionally, it is contemplated that liquid 32 may be a fertilizer, herbicide, fungicide, pesticide, inoculant, vapor barrier, water, and/or other soil or crop agent.

Figure 3:
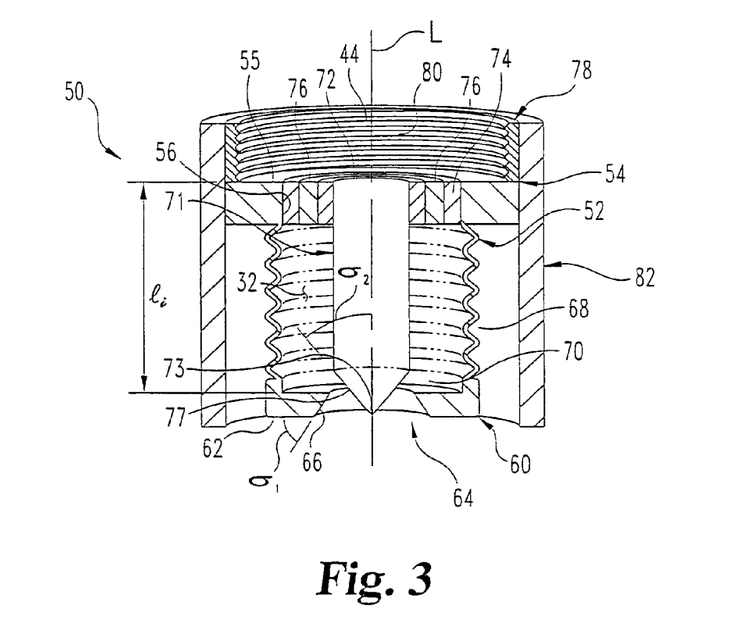
FIG. 3 is an enlarged section view of the nozzle assembly illustrated in FIG. 2.

Nozzle assembly 50 is further illustrated in an enlarged section view in FIG. 3. Nozzle assembly 50 extends along longitudinal axis L and includes an internal chamber 70 partially bound by a sidewall 52 which extends between a proximal end 54 and a distal end 60. Internal chamber 70 is also bound at proximal end 54 by a proximal endwall 55 and at distal end 60 by a distal endwall 62. Nozzle assembly 50 further includes an external sleeve 82 which is structured to surround sidewall 52 and proximal and distal ends 54, 60 to prevent interference with the functionality of nozzle assembly 50 from extraneous forces. In one or more embodiments, sleeve 82 may be coupled with proximal end 54 by any standard manner. Alternatively, it is contemplated that sleeve 82 may be integrally formed with proximal end 54. External sleeve 82 includes a coupling portion 78 disposed proximally of proximal end 54. In the illustrated embodiment, coupling portion 78 includes internal threading 80 structured to engage with and couple nozzle assembly 50 to boom member 40a to place nozzle assembly 50 in fluid communication with liquid supply pathway 44. In other embodiments of assembly 50, sleeve 82 may, at most, only partially extend about sidewall 52. Further details regarding the coupling of nozzle assembly 50 to boom member 40a will be described below with respect to FIG. 9.

A needle or metering member 71 extends distally from proximal endwall 55 to a tapered distal end 73 and includes an annular flange 74 disposed at its proximal end 72 which is sized and structured to engage with an aperture 56 defined by proximal endwall 55. Annular flange 74 includes passages 76 which extend therethrough to provide communication between liquid supply pathway 44 and internal chamber 70. Accordingly, liquid 32 may be received in internal chamber 70 from liquid supply pathway 44. It should be appreciated that annular flange 74 may be coupled with proximal endwall 55 through any standard manner, including, for example, threading, bonding, fusing, adhering or welding, just to name a few possibilities. Still, in an alternative non-illustrated embodiment, it is contemplated that metering member 71 is integrally formed with proximal endwall 55. In this embodiment, distal endwall 55 may include one or more passages similar to passages 76 to provide communication between internal chamber 70 and liquid supply pathway 44. By way of nonlimiting example, as will be discussed with respect to FIGS. 5-7, other alternative embodiments of metering members are contemplated for use with nozzle assembly 50.

As also illustrated in FIG. 3, metering member 71 extends distally through a spray orifice 64 defined by distal endwall 62 when nozzle assembly 50 is in an initial configuration, that is, before liquid 32 is received in internal chamber 70. Spray orifice 64 includes a truncated conical portion 66 which diverges in a distal direction through distal endwall 62 while metering member 71 terminates at a conically shaped tapering portion 77 disposed at distal end 73. It should be appreciated that the positioning of conical portions 66 and 77 relative to one another creates spray 34 as liquid 32 passes through internal chamber 70. In the initial configuration as illustrated, spray orifice 64 remains at least partially open as metering member 71 extends therethrough. However, in one or more alternative embodiments, it is contemplated that spray orifice 64 may be completely blocked by metering member 71 when nozzle assembly 50 is in its initial configuration.

Figure 4:
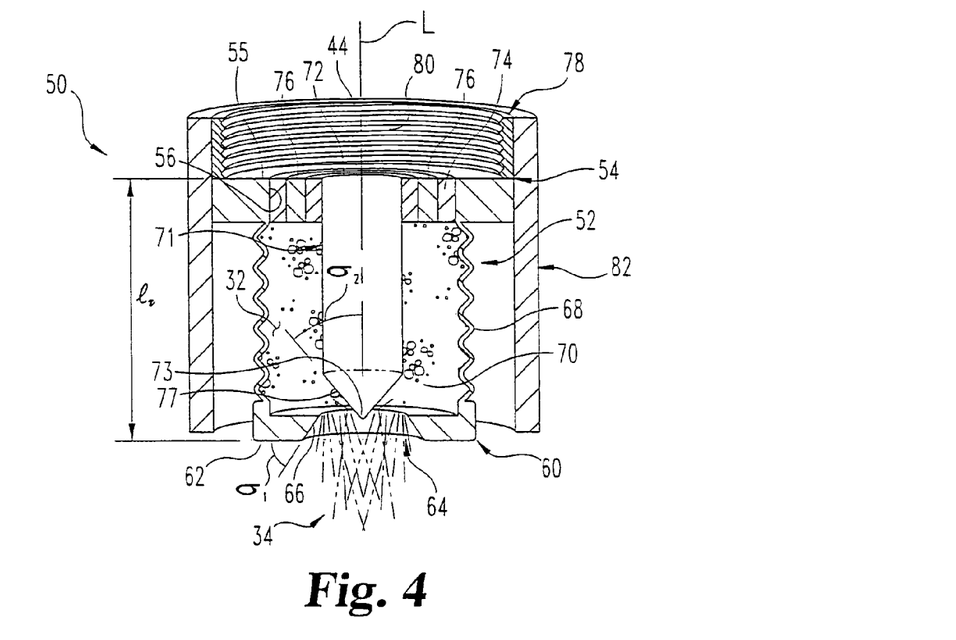
FIG. 4 is an enlarged section view of the nozzle assembly illustrated in FIG. 3 in an expanded configuration.

Sidewall 52 includes an initial length $l_i$ between proximal end 54 and distal end 60 before liquid 32 is received in internal chamber 70. However, as liquid 32 is received in internal chamber 70, sidewall 52 becomes elongated and has a subsequent length $l_s$ which is greater than initial length $l_i$ as illustrated in FIG. 4, where like numerals refer to like features previously described. More particularly, sidewall 52 includes a flexibly deformable portion 68 which becomes elongated as the pressure of liquid 32 in internal chamber 70 increases. In the illustrated embodiment, flexibly deformable portion 68 is sinusoidally shaped. However, alternative configurations are contemplated, including for example, a bellows configuration. Regardless of the configuration of sidewall 52, it should be made from a tough yet elastic material that can withstand the expansion pressures applied thereto while also retaining the capability to return to a reduced size configuration as the pressure decreases. Accordingly, in one embodiment, sidewall 52 may be substantially linear and include a resilient elastic material which deforms in response to sufficient pressure of the liquid 32 in internal chamber 70. Such materials may include elastomeric polymers of a natural and/or synthetic variety, a resiliently configured metal with appropriate dimensioning, such as stainless steel, and such different materials as would occur to those skilled in the art.

It should be appreciated that as sidewall 52 becomes elongated relative to initial length $l_i$, distal endwall 62 moves relative to distal end 73 of metering member 71. Accordingly, as the pressure of liquid 32 in internal chamber 70 increases, sidewall 52 becomes more elongated and distal end wall 62 moves away from distal end 73 of metering member 71 to increase the effective size of spray orifice 64 and the flow rate of spray 34 while maintaining a desired droplet size and pattern of spray 34. Likewise, when the pressure of liquid 32 in internal chamber 70 decreases, sidewall 52 becomes less elongated and the distal endwall 62 moves toward distal end 73 of metering member 71 to decrease the effective size of spray orifice 64 and the flow rate of spray 34 while still maintaining the desired droplet size and pattern of spray 34.

It should be appreciated that the shape and structure of orifice 64 may be altered to vary the spray pattern of nozzle assembly 50. For example, truncated conical portion 66 defines an angle relative to distal endwall 62 which may be altered relative to distal endwall 66 to obtain a different pattern of spray 34. Metering member 71 includes a conical portion 77 at distal end 73 which is disposed oppositely of conical portion 66 of spray orifice 64. Conical portion 77 also defines an angle relative to metering member 71. It should also be appreciated that angle of conical portion 77 may also be adjusted relative to metering member 71 to change a characteristic of spray 34, such as, for example, droplet size.

Figure 5:
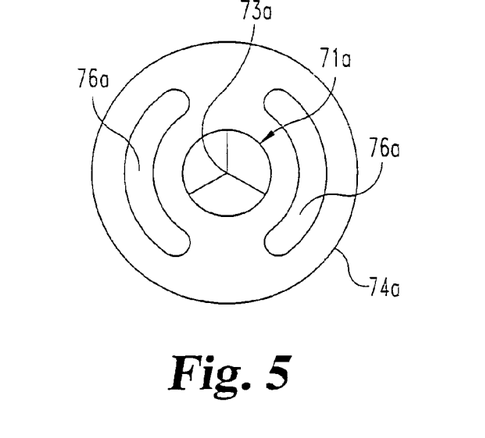
FIG. 5 is a distal end view of one alternative type of a metering member that can be used in place of the metering member in the nozzle assembly of FIGS. 3 and 4.
Figure 6:
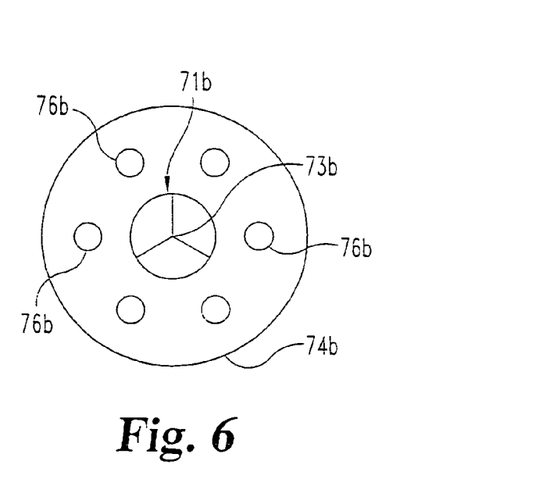
FIG. 6 is a distal end view of another alternative type of a metering member.
Figure 7:
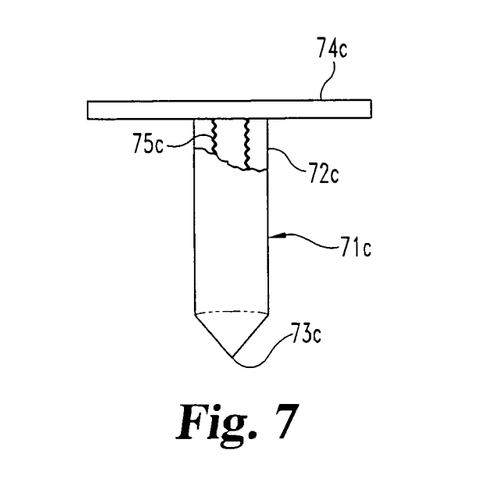
FIG. 7 is a partially exploded, plan view of yet another alternative type of metering member.

Referring now to FIGS. 5-7, there is illustrated alternative embodiment metering members 71*a*-71*c* suitable for use with nozzle assembly 50. With respect to FIGS. 5 and 6, metering members 71*a* and 71*b* are illustrated either of which can be used in place of metering member 71 illustrated in FIGS. 3 and 4. However, in FIG. 5, annular flange 74*a* includes a pair of elongated slots which define passages 76*a*, while in FIG. 6, annular flange 74*b* includes a plurality of spaced apart apertures which define passages 76*b*. It should be appreciated that, beyond the illustrated embodiments, the passage(s) through the annular flange may have numerous alternative shapes and configurations, provided that they facilitate communication between liquid supply pathway 44 and internal chamber 70.

With respect to FIG. 7, metering member 71*c* is threadedly detachable from annular flange 74*c* via threaded interconnection 75*e*. More particularly, one of metering member 71*c* and annular flange 74*c* may include an internally threaded portion while the other includes an externally threaded portion engageable with the internally threaded portion. In another non-illustrated embodiment, where proximal endwall 55 defines one or more passages providing communication between liquid supply pathway 44 and internal chamber 70, metering member 71*c* may be threadingly coupled with a portion of proximal endwall 55. For example, similar to the embodiment of FIG. 7, one of metering member 71*c* and proximal endwall 55 may include an internally threaded portion while the other includes an externally threaded portion engageable with the internally threaded portion. In either form, the threaded interconnection provides straightforward removal and replacement of metering member 71. Accordingly, if a user desires to change the droplet size of spray 34, such user may simply remove a metering member and replace it with another metering member having a different angle.

Figure 8:
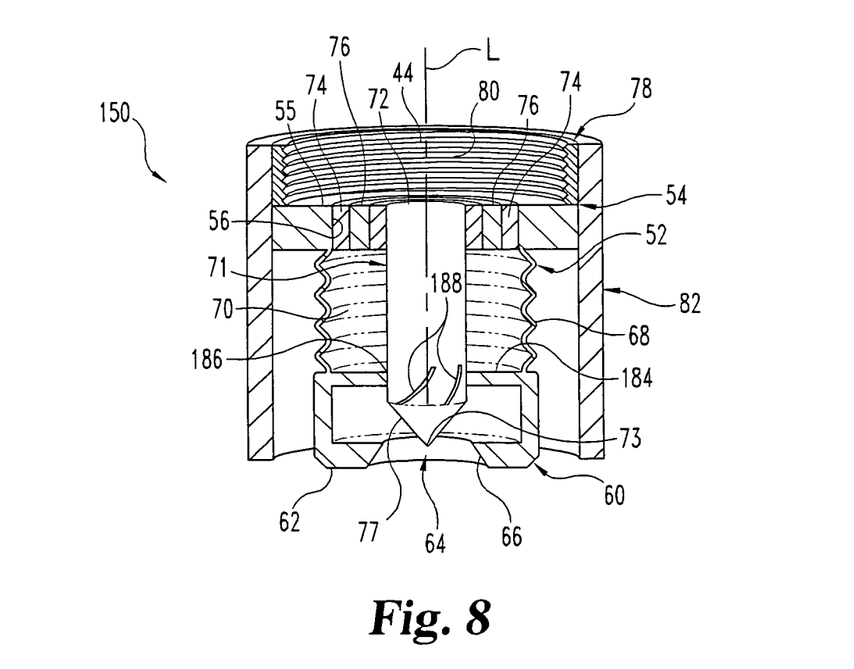
FIG. 8 is an enlarged section view of another type of nozzle assembly that can be used in place of the nozzle assembly of FIGS. 3 and 4.

The present application also contemplates alternative embodiment nozzle assemblies. For example, an enlarged section view of a pre-orifice valve nozzle assembly 150 is depicted in FIG. 8, where like numerals refer to like features previously described. Nozzle assembly 150 is similar to nozzle assembly 50 except that internal chamber 70 includes a partition 184 positioned proximal to distal end 60. Partition 184 includes an aperture 186 through which distal end 73 of metering member 71 extends. The portion of metering member 71 extending through aperture 186 may also include a plurality of flutes 188 structured to deliver liquid 32 through aperture 186 into communication with spray orifice 64. In this embodiment, as the pressure of liquid 32 in internal chamber 70 increases, partition 184 and distal endwall 62 will each move distally relative to metering member 71 to proportionally change the effective size of aperture 186 and spray orifice 64 while also changing the droplet size and velocity of spray 34. Moreover, as the pressure of liquid 32 decreases, partition 184 and distal endwall 62 will each move proximally relative to metering member 71 to proportionally change the effective size of aperture 186 and spray orifice 64 while also changing the droplet size and velocity of spray 34. In addition to the pre-orifice valve nozzle assembly of FIG. 8, the present application also contemplates other alternative nozzle assemblies as well. For example, nozzle assembly 50 could be modified for use in a whirl chamber nozzle or an impact flood nozzle, just to name a few possibilities.

Figure 9:
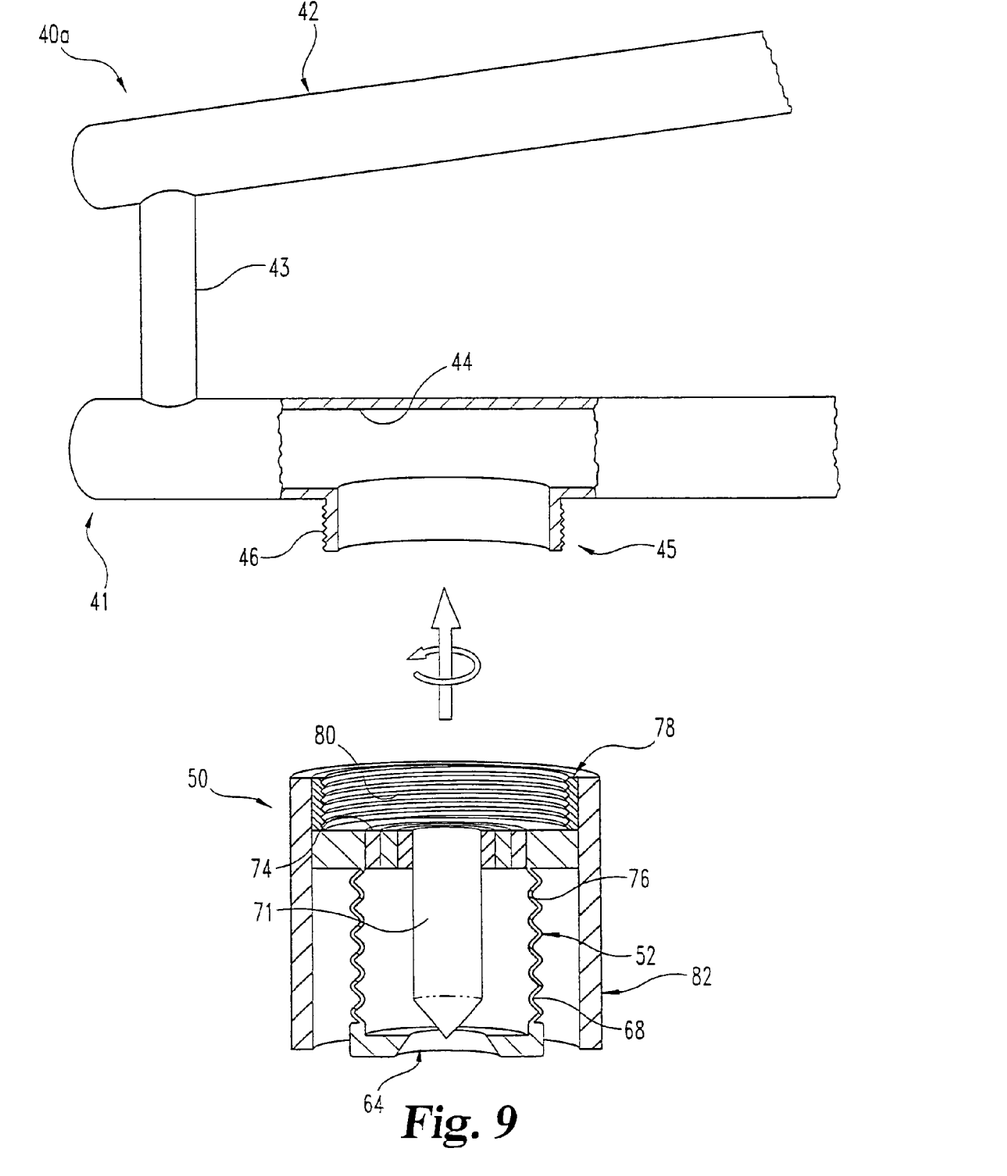
FIG. 9 is an enlarged, partial section view of the nozzle assembly of FIGS. 3 and 4 positioned relative to the boom member of the spraying implement shown in FIGS. 2 and 3.

As indicated above, further details regarding the coupling of nozzle assembly 50 with boom member 40*a* will be provided with respect to FIG. 9, where nozzle assembly 50 is positioned relative to boom member 40*a*. In the illustrated embodiment, boom member 40*a* includes a coupling portion 45 in fluid communication with liquid supply pathway 44. Coupling portion 45 includes external threading 46 extending thereabout. Accordingly, nozzle assembly 50 may be translated toward boom member 40*a* and rotated to engage internal threading 80 with external threading 46 to couple nozzle assembly 50 to boom member 40*a*. While not illustrated, it should be appreciated that one or more seals, gaskets, o-rings and/or sealants may be placed between nozzle assembly 50 and boom member 40*a* to achieve a fluid tight coupling therebetween. Furthermore, coupling between nozzle assembly 50 and boom member 40*a* may be accomplished through other non-illustrated manners. For example, coupling therebetween may be achieved by adhering, bonding, welding, pinning, press fitting, snap fitting or interference fitting, just to name a few possibilities.

Still, other manners of coupling a nozzle assembly with the boom members are contemplated. For example, in FIG. 10, where like numerals refer to like features previously described, there is illustrated an alternative embodiment boom member 240*a* and an alternative embodiment nozzle assembly 250. In this embodiment, boom member 240*a* still includes a coupling portion 45 in fluid communication with liquid supply pathway 44. Coupling portion 45 also includes external threading 46 extending therearound and a distal face 247 which defines an aperture 248. Similar to aperture 56 described above, aperture 248 is sized and configured to engage with annular flange 74 of metering member 71 through any standard manner. Moreover, while passages 76 are provided through flange 74, it is contemplated that passages similar to passages 76 may be provided through distal face 247 to provide fluid communication between internal chamber 70 and liquid supply pathway 44. In one or more embodiments, metering member 71 including flange 74 may be readily disconnected and reattached to boom member 240*a*. Additionally, in another embodiment, it is contemplated that metering member 71 may be readily disconnected from flange 74 or distal face 247, similar to metering member 71*c* as described above with respect to FIG. 7.

Proximal end 54 of intermediate portion 251 includes a coupling portion 257 structured to engage with coupling portion 45. More particularly, coupling portion 257 includes internal threading 258 structured to engage with external threading 46 as intermediate portion 251 is rotated into engagement with boom member 240*a*. Coupling portion 257 also includes external threading 259 positioned about proximal end 54. External threading 259 is configured to engage with internal threading 280 of coupling portion 278 of external sleeve 282 to provide a barrier between intermediate portion 251 and extraneous forces. While not illustrated with respect to FIG. 10, it should be appreciated that one or more seals, gaskets, o-rings and/or sealants may be used during coupling between nozzle assembly 250 and boom member 240*a* to achieve a fluid tight coupling therebetween.

Figure 10:
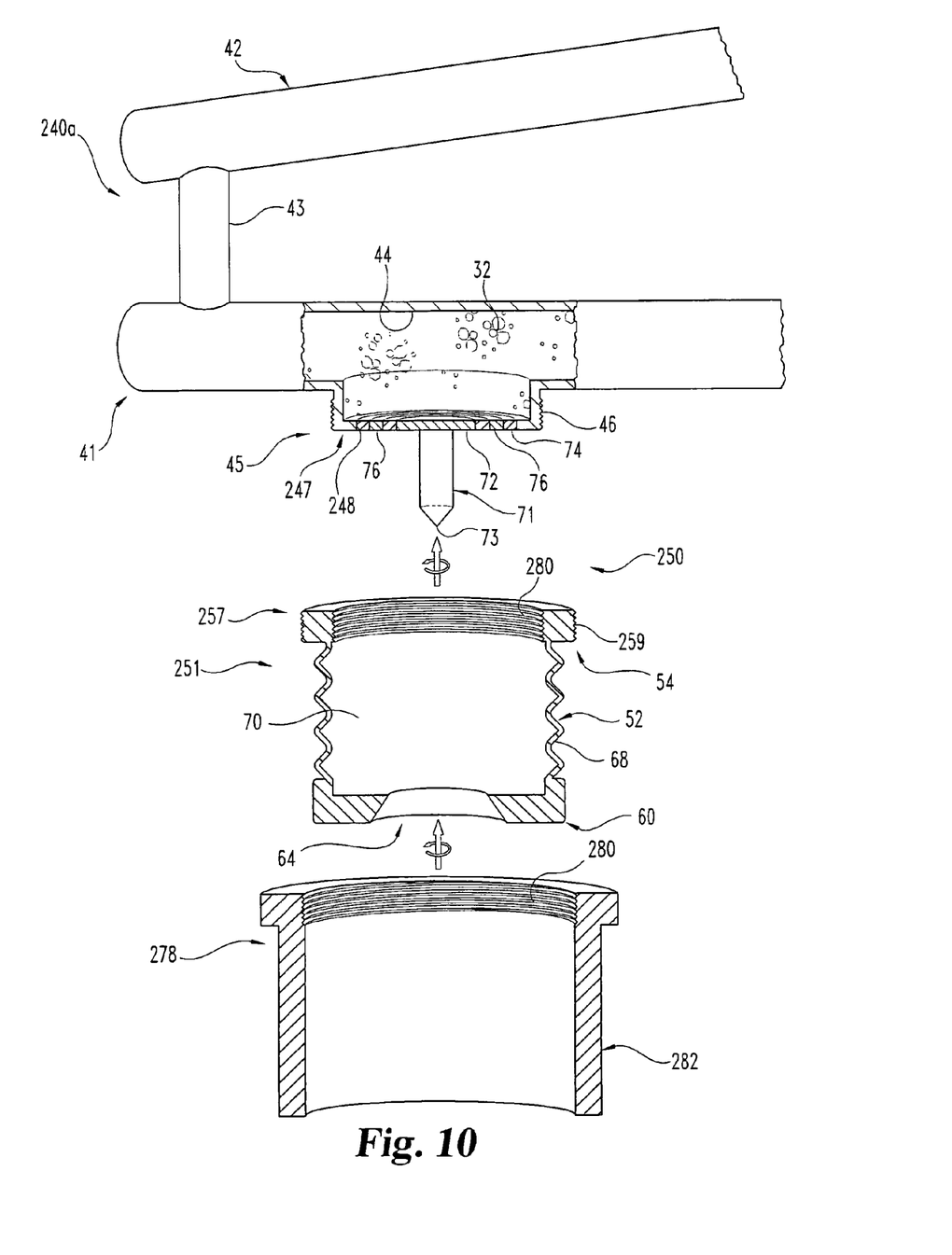
FIG. 10 is an enlarged, partial section view of yet another nozzle assembly positioned relative to an alternative form of boom member of a spraying implement.

The above described configuration of coupling between nozzle assembly 250 and boom member 240*a* generally facilitates easy interchangeability of various components. For example, a user may replace one or more of metering member 71 and intermediate member 251 in order to alter the characteristics of the spray created by nozzle assembly 250.

Figure 11:
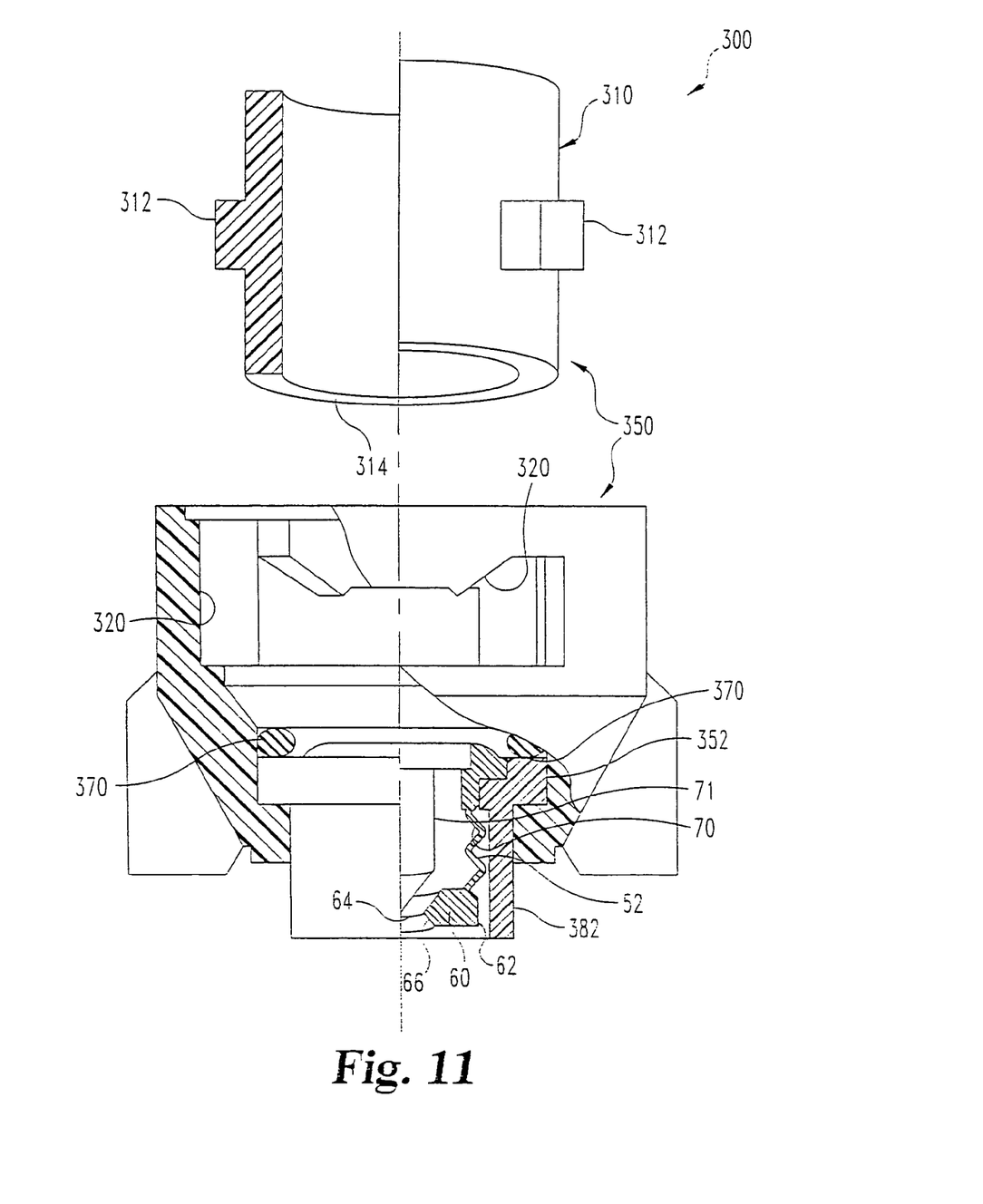
FIG. 11 is a partial sectional, assembly view of still another type of nozzle depicting connection of a nozzle tip of the present application to a standard form of nozzle body.

FIG. 11 depicts nozzle assembly 300 of a further embodiment of the present application; where like reference numerals refer to like features previously described. Assembly 300 includes nozzle 350 that can be used with implement 10 or in any other applications described herein. Nozzle 350 includes a standard nozzle body 310 and variable orifice nozzle tip 352. Variable orifice nozzle tip 352 is configured with sidewall 52, distal endwall 62 at distal end 60, variable spray orifice 64 defining conical portion 66, chamber 70, and metering member 71 as described in connection with previous embodiments. Nozzle tip 352 further includes sleeve 382 that is configured like sleeve 82 except that it has a relatively greater distal extension and defines a coupling mechanism other than threading. The upper portion of nozzle tip 352 defines a coupling seat 360 configured to receive nozzle body therein. A rubber o-ring 370 is positioned in the base of coupling seat 360 to form a seal with the end of nozzle body 310 when nozzle body 310 is coupled to nozzle tip 352.

Specifically, coupling is provided by a bayonet-type twist-on connection. Nozzle body 310 is of a preexisting type that includes male protrusions 312 to provide the bayonet-type connection. Nozzle body 310 also includes nozzle body passage 314 that is in fluid communication with chamber 70 when nozzle body 310 and nozzle tip 352 are coupled together. Liquid for discharge in the form of a spray through orifice 64 is provided from nozzle body 310 to chamber 70 of nozzle tip 352 through nozzle body passage 314. An exemplary female slot 320 is depicted in an upper portion of nozzle tip 352 that receives a corresponding one of protrusions 312 for twist-on connection. As depicted, slot 320 intersects the cavity formed by seat 360.

Nozzle assembly 300 corresponds to a retrofit application of nozzle 350 in which a variable orifice nozzle tip 352 is applied by replacing a preexisting nozzle tip of a standard/conventional type, such that both use nozzle body 310 to feed liquid for spray dispersal.

Many further embodiments of the present application are envisioned. For example, non-agricultural implementations are contemplated. Such implementations include, but are not limited to, sprays applied to pharmaceutical products (such as tablet coating) and/or food products (such as glazes, flavorings, and other coatings), coatings applied in the chemical processing industry, glue application for creating plywood, other adhesive/bonding applications, painting, powder sprays, wetting and lubrication agent applications, or the like—to name just a few possibilities. Furthermore, it should be appreciated that in any application the spray target may be carried by a conveyor or other apparatus moving by a nozzle that is fixed as it applies the spray. Alternatively or additionally, a variable liquid nozzle chamber may be implemented with a mechanism responsive to changing liquid pressure therein to adjust chamber dimension and correspondingly spray orifice size that may or may not be elastomeric—such as a pressure-sensitive telescoping or hinged mechanism that may be comprised of relatively rigid articulating members of an inelastic character.

In another example, the invention is utilized to deliver a powder, slurry, gas or other fluid in lieu of or in addition to a liquid. Still another example comprises equipment including means for applying an agricultural spray to a field with an agricultural spraying implement; means for providing the spray from an agricultural liquid from a tank; means for generating the spray from the liquid with a nozzle; and means for controlling the spray with an adjustable spray orifice of the nozzle in response to a change in pressure of the liquid supplied to the nozzle from the tank. The controlling means includes: means for receiving the liquid from the tank in a nozzle chamber terminating in the spray orifice, means for varying a dimension of the chamber in reaction to a change in pressure, and means for moving the spray orifice relative to a metering member to adjust the spray in response to the varying dimension of the chamber.

According to a further aspect, there is provided a nozzle assembly structured to spray a liquid. The nozzle assembly generally includes a housing with an internal chamber bounded by a sidewall extending between a proximal end and a distal end. The sidewall terminates at a distal face which bounds the internal chamber at the distal end. A liquid supply pathway, which is in communication with the internal chamber, supplies the liquid to the internal chamber. The nozzle assembly also includes a spray orifice defined through the distal face, which is also in fluid communication with the internal chamber. A metering member, which extends distally from the internal chamber through the spray orifice, is also included with the nozzle assembly. Further, at least a portion of the sidewall is elastically deformable to change a dimension between the distal end and the proximal end in response to a degree of pressure change in the internal chamber. As the dimension changes in response to the degree of pressure, the distal face moves relative to the metering member to adjust effective size of the spray orifice.

Yet another aspect includes a method for spraying a liquid. More particularly, the method includes applying an agricultural spray to a field with an agricultural spraying implement, providing the spray from an agricultural liquid in a tank and generating the spray from the liquid with a nozzle. The method also includes, in response to a change in pressure of the liquid supplied to the nozzle from the tank, controlling the spray with an adjustable spray orifice of the nozzle. With respect to controlling the spray, it includes receiving the liquid from the tank in a nozzle chamber having a deformable sidewall portion. The nozzle chamber terminates in the spray orifice, which is in fluid communication with the chamber. A metering member, which extends from the nozzle chamber through the spray orifice, is also included with the nozzle assembly. Moreover, controlling the spray also includes, in reaction to the change in pressure, varying a dimension of the chamber with the deformable sidewall portion. In response to varying the dimension of the chamber, the spray orifice moves relative to the metering member to adjust the spray.

Still, according to another aspect, there is provided a nozzle assembly structured to spray a liquid. The nozzle assembly generally includes a sleeve member extending between a proximal end and a distal end, with the distal end defining a distal endwall. An internal chamber is at least partially enclosed by the sleeve member and extends from a proximal side of the distal endwall toward the proximal end of the sleeve member. The internal chamber is also in fluid communication with a liquid supply pathway, from which the liquid may be received, and a spray orifice defined through the distal endwall. The nozzle assembly also includes a needle member which extends distally from the internal chamber toward the spray orifice. Additionally, at least a portion of the sleeve member is resiliently pliable to change a configuration of the sleeve member in response to a degree of pressure change in the internal chamber. When the configuration changes, the distal endwall moves relative to the needle member to adjust effective size of the spray orifice.

Another embodiment of the present application includes: receiving liquid in a chamber of a nozzle, the nozzle including an orifice in fluid communication with the chamber and a metering member; applying a liquid spray to a target from the orifice during relative movement between the nozzle and the target; varying a dimension of the chamber in response to changing pressure of the liquid in the chamber; and with the varying dimension of the chamber, adjusting size of the orifice to regulate application of the liquid spray to the target. One form of this embodiment includes changing position of the metering member relative to the orifice. Still another form of this embodiment includes: providing a variable orifice nozzle tip including the chamber, the orifice, the metering member, the sidewall, and the distal face; removing a preexisting nozzle tip from a preexisting nozzle body; and securing the variable orifice nozzle tip to the preexisting nozzle body to provide a retrofit application of the nozzle. The target may include any item subject to spraying or coating, including but not limited to a pharmaceutical, agricultural, adhesive, painting, wetting agent, and lubricant target.

A further embodiment of the present application is directed to an apparatus that comprises a nozzle including a chamber, an orifice in fluid communication with the chamber and a metering member; and further comprises means for providing a liquid to the chamber under pressure, means for applying a liquid spray to a target from the orifice during relative movement between the nozzle and the target, means for varying a dimension of the chamber in response to changing pressure of the liquid in the chamber, and means for adjusting position of the metering member relative to the orifice to vary size of the orifice and regulate application of the liquid spray to the target as the dimension of the chamber changes. The target may include any item subject to spraying or coating, including but not d to a pharmaceutical, agricultural, adhesive, painting, wetting agent, and lubricant target.

Still another embodiment includes a process to retrofit a variable orifice nozzle tip according to the present application to a preexisting nozzle body that originally was coupled to a conventional nozzle tip. One implementation of this process includes providing a variable orifice nozzle tip including a chamber, an orifice intersecting the chamber, a metering member extending through the chamber, and a sidewall bounding the chamber; removing a preexisting nozzle tip from a preexisting nozzle body; and securing the variable orifice nozzle tip to the preexisting nozzle body to provide a retrofit application of a nozzle. A kit for such a process is contemplated in a further embodiment.

Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow. In reading the claims it is intended that when words such as "a," "an," "at least one," "at least a portion" are used there is no intention to limit the claim to only one item unless specifically stated to the contrary in the claim. Further, when the language "at least a portion" and/or "a portion" is used the item may include a portion and/or the entire item unless specifically stated to the contrary. While the invention has been illustrated and described in detail in the drawings and foregoing description, the same is to be considered as illustrative and not restrictive in character, it being understood that only the selected embodiments have been shown and described and that all changes, modifications and equivalents that come within the spirit of the invention as defined herein or by any of the following claims are desired to be protected.

What is claimed is:

1. An apparatus, comprising:
 a nozzle assembly structured to spray a liquid, the nozzle assembly including:
 a liquid supply pathway;
 a housing including an internal chamber bounded by a sidewall extending between a proximal end and a distal end, the sidewall terminating at a distal face bounding the internal chamber at the distal end, the internal chamber being in communication with the liquid supply pathway to receive the liquid therefrom;
 a spray orifice defined through the distal face, the spray orifice being in fluid communication with the internal chamber;
 a metering member extending distally from the internal chamber through the spray orifice; and
 wherein at least a portion of the sidewall is elastically deformable to change a dimension between the distal end and the proximal end in response to a degree of pressure change in the internal chamber, and the distal face moves relative to the metering member when the dimension changes to adjust effective size of the spray orifice.

2. The apparatus of claim 1, further comprising an agricultural spraying implement including the nozzle assembly and a tank holding the liquid, the tank being in fluid communication with the liquid supply pathway.

3. The apparatus of claim 1, wherein the sidewall terminates at a proximal face at the proximal end, the proximal face bounding the internal chamber at the proximal end, the proximal face including the metering member extending distally therefrom and a passageway extending therethrough to provide fluid communication between the internal chamber and the liquid supply pathway.

4. The apparatus of claim 3, further comprising a coupling portion disposed proximally of the proximal face, the coupling portion being structured to engage with a nozzle coupling portion of an agricultural spraying implement.

5. The apparatus of claim 1, further comprising means for coupling the nozzle assembly with an agricultural spraying implement, and wherein the agricultural spraying implement includes means for bounding the internal chamber at the proximal end of the sidewall.

6. The apparatus of claim 1, further including an exterior casing member including a hollow interior, the hollow interior being structured to retain the housing therein.

* * * * *